ated threaded shaft through which a rod-receiving
United States Patent

Maranell

[19]

[11] 3,913,888

[45] Oct. 21, 1975

[54] ROD POST INSULATOR FOR ELECTRIC FENCES

[75] Inventor: Melvin C. Maranell, Minneapolis, Minn.

[73] Assignee: Sta-Tite Corporation, St. Bonifacius, Minn.

[22] Filed: Dec. 9, 1974

[21] Appl. No.: 531,093

[52] U.S. Cl. .............. 256/10; 174/154; 174/158 F
[51] Int. Cl.² .................................................. A01K 3/00
[58] Field of Search .......... 256/10; 174/154, 158 F, 174/161 F, 163 F

[56] References Cited
UNITED STATES PATENTS

| | | | |
|---|---|---|---|
| 2,609,418 | 9/1952 | Binns et al. | 256/10 |
| 3,214,141 | 10/1965 | Wilson | 256/10 |
| 3,464,671 | 9/1969 | Thomas | 256/10 |

Primary Examiner—Paul R. Gilliam
Assistant Examiner—Doris L. Troutman
Attorney, Agent, or Firm—Williamson, Bains & Moore

[57] ABSTRACT

A rod post insulator mountable on any of a plurality of rods within a predetermined range of rod thicknesses has an insulator body formed of insulative material and having fence wire retaining means and an elongated threaded shaft through which a rod-receiving opening is formed. A threaded nut threadably engages the threaded shaft, and a washer formed of insulative material is positioned on the shaft between the rod-receiving opening and the threaded nut so as to be urged toward the opening in response to forward rotation of the threaded nut, causing the washer to successively overlap the rod-receiving opening to closely confine a rod within the opening and retain the body on the rod post. The washer is formed with a plurality of pairs of slots positioned about its generally circular periphery, each pair of slots being of a predetermined size to engage any rod receivable by the pair of slots and grip the rod as it passes through the rod-receiving opening of the body. The washer is constructed so as to be compressable between the rod and the nut to generate a reactive restoring force on the rod to keep the body in position on the rod. The invention makes it possible to use a single rod post insulator for rod posts having a wide range of diameters.

9 Claims, 8 Drawing Figures

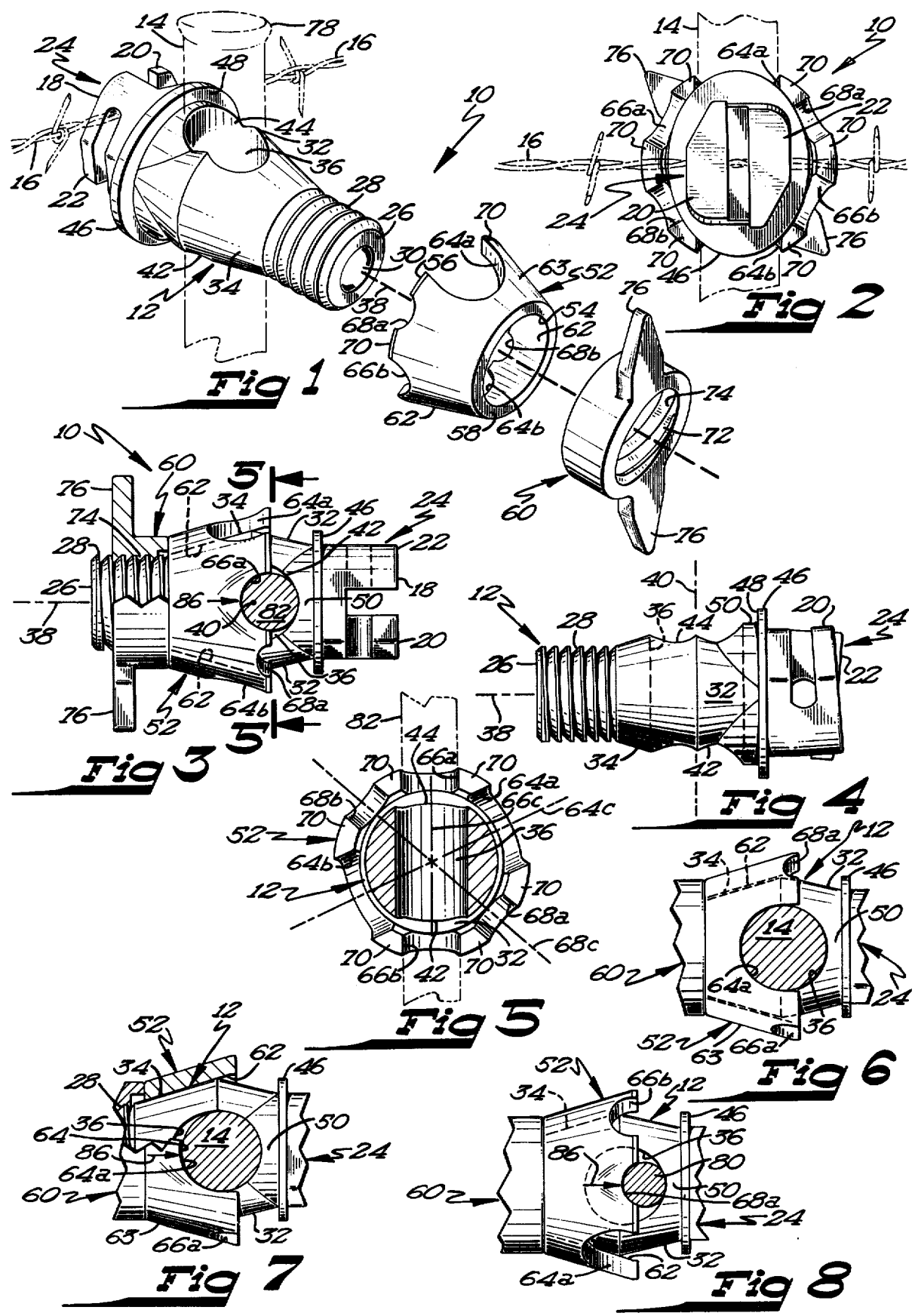

ROD POST INSULATOR FOR ELECTRIC FENCES

BACKGROUND OF THE INVENTION

The invention relates to the field of fence post insulators and comprises a structure which may be readily attached on commercially available rod posts, and is capable of handling the increased electrical charges now being used to contain livestock.

In recent years the use of electrical fencing for containment of livestock has increased substantially. Improvements in insulator design and material have promoted this trend, the rod post and the rod post type insulator formed of plastic or plastic-like material and installed on rod-type posts fast becoming a most popular combination for electric fencing. The rod posts most commonly used in electric fencing are of round cross section and are available in a substantial variety of crosssectional diameters, the diameters often ranging from as small as 5/16 inch to as large as 13/16 inch diameter. While the posts are made primarily in three diameters, namely ⅜, ½ and ¾ inch, there is sufficient tolerance in the commercially available rods to cause the actual product to commonly range as much as a sixteenth of an inch above or below the specified diameters. It is extremely common for a fence builder to have a variety of different size rod posts on hand and to incorporate them in a single fence line. Since such fence lines may extend for hundreds of yards or even miles, it is presently necessary that a fence builder carry a variety of rod post insulators while the fence is being constructed, because each presently available rod post insulator is made to fit a specific diameter rod post, and accordingly is not usable on a post of larger or smaller diameter than that for which it is intended. For example, a rod post insulator preformed to receive a post of ⅜ inch diameter cannot be used on a ½ or ¾ inch diameter rod. Correspondingly, a rod post insulator sized to receive a ¾ inch rod cannot reliably be retained on a ⅜ inch rod. Occasionally, even an insulator designed for a half-inch rod will not fit well on a half-inch rod if the rod happens to be malformed or if the end of the rod has been flared outwardly by the hammer blows necessary to drive the rod into the ground.

Because of the variety of rod post diameters used in constructing fences, it has become necessary for farmers and other land owners to carry a variety of insulator sizes with them while constructing the fence line and often to test several insulator sizes on a given post before determining the best size insulator for the particular post, since the slight diameter differences in commercially available rod posts may not be readily measured by the eye and accordingly not easily matched to a particular insulator size. Accordingly, it is desirable to provide a single rod post insulator usable on a wide range of rod post diameters and capable of being used even on malformed rod posts or those having their ends flared by hammering.

SUMMARY OF THE INVENTION

The invention utilizes a rod post insulator having a body formed of insulative material with a wire-retaining means at its forward end and a threaded shaft extending rearwardly. A rod-receiving opening is positioned between the retaining means and the threaded shaft and is of a size large enough to receive the rod of greatest thickness on which the insulator is to be mounted. A dome shaped washer, also formed of insulative material, has a shaft-receiving orifice therethrough and is mounted on the shaft of the insulator body for movement toward and away from the rod-receiving opening. The washer is provided with a plurality of pairs of slots or steps positioned about its base, each pair being positioned to confront and bear against a rod passing through the rod-receiving opening of the body. A nut threadably engages the threaded shaft of the body, urging the washer forwardly into engagement with the rod and retaining the insulative body on the rod, a pair of slots on the washer being moved forwardly to successively further overlap the rod-receiving opening and grip the rod between the opening and the slots to keep the washer on the rod. Each pair of slots is of generally arcuate cross section and is sized to receive a rod post of particular diameter, permitting one of the pairs of slots to be usable with and adapted for any commercially available rod post diameter within a range of thicknesses.

The insulative body has a bulbous segment between the rodretaining means and the threaded shaft to permit the rod-receiving opening to be of a large diameter approximating that of the diameter of the threaded shaft to thereby receive a large diameter rod post. The bulbous segment of the body has an outwardly tapered exterior shoulder substantially concentric with the threaded shaft and an interior shoulder within the orifice of the washer is matably receivable on the exterior shoulder of the body, controlling the amount of forward movement of the washer along the shaft of the insulator body. The washer is formed of an elastically compressible plastic or plastic-like material, and when the interior shoulder engages the exterior shoulder of the shaft the slots overlap the rod-receiving opening an amount greater than that needed to contain any rod within the range rods for which the insulator is designed. As a result of this structure, when the washer is compressed between a rod post and the nut as a result of tightening the nut the washer's interior shoulder is urged into contact with the exterior shoulder of the body as the washer is compressed and the compression generates a restoring reaction force against the rod to better retain the insulator on the rod. The mating interior and exterior shoulders of washer and body, respectively, prevent overtightening and provide a stop which, when encountered, indicates to the fence builder that the nut has been tightened adequately.

Accordingly, the invention permits a single insulator type to be used for substantially all commercially available rod posts likely to be encountered by a fence builder and eliminates the problem of his having to carry an assortment of insulator types or sizes to handle the different diameter posts encountered during fence building. As a result, also, the fence builder need no longer waste time attempting to select the right insulator for a particular post, being assured that the rod post insulator described herein will fit the posts available.

These and other advantages of the invention will appear from the following detailed description and the appended drawings.

BRIEF DESCRIPTION OF THE DRAWING

FIG. 1 is an exploded perspective drawing of the insulator invention with a large-diameter fence post and conductive wire shown in phantom.

FIG. 2 is a front elevation view of the insulator of FIG. 1 with a small-diameter post and conductive wire shown in phantom.

FIG. 3 is a top elevation view of the insulator of FIG. 2 with the insulator mounted on a rod post of medium diameter.

FIG. 4 is a side elevation view of the insulator body of FIG. 3 with the washer and nut removed.

FIG. 5 is a cross-sectional view of the insulator of FIG. 3 taken along cutting plane 5—5 and showing a medium-diameter rod post in phantom.

FIG. 6 is a partial top elevational view of the insulator of FIG. 3 showing the washer engaging a post of large diameter but not yet tightened to the point of compressing the washer.

FIG. 7 is a partial top elevation view of the insulator of FIG. 6 showing the washer engaging the post and the nut compressing the washer against the post to generate a restoring reaction force against the post.

FIG. 8 is a partial top elevation view of the insulator of FIG. 3 showing the washer engaging a post of small diameter.

DESCRIPTION OF THE PREFERRED EMBODIMENT

Referring now to FIGS. 1–4 of the drawing, an insulator 10, embodying the invention, has a body 12 shown mounted on a rod post 14 (FIGS. 1 and 2) and carrying a conductive fence wire 16, which may be smooth or barbed wire.

The body 12 is molded of plastic or plastic-like material and at its forward end 18 has upwardly and downwardly projecting fingers 20 and 22, respectively, which collectively comprise fence wire retaining means 24 for retaining the fence wire 16 therebetween.

At the rearward end 26 of the body 12 is an elongated, threaded shaft 28 which preferably has a round cross section, the interior 30 of the shaft 28 being partially hollow to reduce the amount of plastic required to mold the insulator and thereby reduce its overall weight.

Positioned between the retaining means 24 and the elongated shaft 28 is a bulbous segment 32 which includes an outwardly and forwardly tapered exterior shoulder 34, the segment 32 preferably having an overall width greater than the width of the shaft 28, as best shown in FIG. 3, to accommodate the large rod-receiving opening 36 which extends transversely through the shaft 28, preferably with its axis 40 intersecting and perpendicular to the axis 38 of shaft 28. Because the largest diameter commercially available rod post seldom exceeds ¾ inch in diameter, the opening 36 is preferably circular with a diameter of 13/16 inch, allowing the extra 1/16 inch in the event the rod has a flared end or other surface irregularity. While the 13/16 inch opening has been found extremely satisfactory for the now available rod posts, it should be understood that other values may be used in its place in the event commercially available rod post sizes should change, and the purview of the invention is not limited to a particular size opening 36.

The rod-receiving opening 36 is preferably positioned with the axis 40 passing through the thickest portion of the bulbous segment 32 as best shown in FIG. 3, the opening 36 intersecting the lower and upper surfaces of segment 32 to define an entry 42 and exit 44, respectively.

Positioned between the retaining means 24 and the opening 36 is an outwardly extending flashguard 46 which is generally elliptical in shape, as best seen in FIG. 2, and provides additional electrical isolation between the fence wire 16 and the post passing through opening 36. The rearward surface 48 of the flashguard 46 is spaced forwardly from the opening 36 to define a gap 50 between the surface 48 and the post. When rain on the upper part of the post 14 runs downwardly onto the insulator body 12, it flows into gap 50 and then downwardly along the sides of the body 12, being prevented from running forwardly over the edge of the flashguard and onto the wire-retaining means 24. If the described gap were not provided and the flashguard was in direct contact with the post, rainwater flowing down the post would flow forwardly over the flashguard 46 and onto the fingers 20 and 22, causing shorting between wire 16 and the post. Preferably the gap 50 is approximately 1/8" in size.

A generally dome-shaped washer 52 is formed of molded insulative plastic or plastic-like material and has a generally circular cross section shaft-receiving orifice 54 passing therethrough. The orifice 54 extends from the base 56 of the dome and terminates at the nut-engaging face 58 which receives and bears against a threaded nut 60 to be described hereafter.

The washer 52 is mounted on the shaft 28 with the central axis 38 of the shaft being substantially coincident with the central axis of the orifice 54, the washer being movable toward and away from the rodreceiving opening 36 of the body 12 and of sufficient height between base 56 and face 58 to permit the washer to overlap the opening 36 to reduce the effective size of the opening. The washer has an interior shoulder 62 which is tapered inwardly from base 56 to face 58 and is matably receivable against the exterior shoulder 34 of bulbous segment 32, the exterior shoulder 34 limiting the extent of forward travel of the washer 52.

The sidewall 63 of the washer 52 is provided with a plurality of steps or slots 64a, 64b, 66a, 66b and 68a and 68b, the steps or slots having successively shallower depths as measured from the base 56 toward the face 58. Each of the steps or slots comprises a clamp whose purpose is engaging and bearing against a rod post extending through the rodreceiving opening 36. The clamps cooperate with the body 12 to retain the insulator on a rod post with the nut 60 forcing the washer 52 against the rod, as will be described hereafter.

The steps or slots 64a and 64b are of generally arcuate cross section and comprise a cooperating pair of clamps positioned along and symmetrical about a common axis 64c (FIG. 5) so as to readily engage a rod post 14 lying on the axis 64c. Best results have been obtained by having the slots 64a and 64b of constant radius with the diameter of these slots being ¾" when the rod-receiving opening 36 has a diameter of 13/16 inch. The interaction between the interior shoulder 62 of the washer and the exterior shoulder 34 of the washer body 12 is such that when the washer interior shoulder is contacting the exterior shoulder 34 the apex 64 of slots 64a and 64b overlap the rod-receiving opening 36 as best shown in FIG. 7, permitting the washer slots or steps 64a and 64b to solidly engage and partially circumscribe the rod 14, and in cooperation with the washer body 12 firmly grip the rod 36 therebetween when the nut 60 is moved into tight engagement against the face 58 of the washer 52. Because the largest diameter post likely to be used with the insulator 10 is a ¾ inch diameter post, the 13/16 inch diameter rod-receiving opening 36 allows sufficient clearance for an oversized ¾ inch post or for a ¾ inch post having a flared end. Any looseness between the opening 36 and the post 14 can be taken up and absorbed by forcing the washer 52 against the rod 14 by tightening of nut 60. When the rod-receiving opening is of 13/16 inch diameter, it is desirable that the arcuate slots 64a and 64b be of ¾ inch diameter, permitting them to readily engage a ¾ inch post, or a post slightly over or under that diameter. With a ¾ inch diameter the slots 64a and 64b are particularly effective for posts ranging in diameter from 11/16 to 13/16 inch. While it is possible to retain the insulator on the post if only a single slot 64a or 64b is applied against the post, it has been found more effective to use the pair of cooperating slots 64a and 64b to grip the post, thereby obtaining reliable, long lasting mounting.

Cooperating slots or steps 66a and 66b comprise a second pair of clamps and are preferably of arcuate cross section with a constant diameter, the slots 66a and 66b being positioned along and symmetrical about a common axis 66c which is perpendicular to and intersects the axis 38 of the shaft 28. Because the clamps 64a and 64b will conveniently handle post sizes from 11/16 inch diameter through 13/16 inch diameter, the slots 66a and 66b are preferably formed with a smaller diameter such as ½ inch, which can be used to effectively engage posts having diameters from 7/16 to ⅝ inch.

The cooperating steps or slots 68a and 68b comprise a third pair of clamps and are preferably of arcuate cross section with the slots being positioned along and symmetrical about a common axis 68c which is generally perpendicular to and intersects the longitudinal axis 38 of the shaft 28. Based on the present sizes of commercially available rod posts, it is preferred that the diameter of the slots 68a and 68b be ⅜ inch, permitting the slots to be conveniently used with posts ranging in diameter from 5/16 to 7/16 inch. Accordingly, the described three pairs of slots or steps which are at diametrically opposed edges of the orifice 54 permit any size post ranging in diameter from approximately 5/16 to 13/16 inch to be easily received and accommodated in the insulator by rotation of the washer 52 so as to align the best fitting of the pairs of slots or steps with the post which passes through rod-receiving opening 36.

While it is preferred that the slots 64a, 64b, 66a, 66b, 68a and 68b be arcuate in cross section as already described, it should be understood that effective operation can be obtained if the slots are of V-shaped, U-shaped or rectangular configuration, and such configurations are within the purview of the invention.

Between each slot is an ear 70 which reinforces the sides of each slot, permitting secure gripping of the post to better retain the insulator 10 thereon.

It has been found particularly effective to form the washer 52 of elastically deformable plastic or plastic-like material which is sufficiently elastically deformable to permit the washer to be compressed as described below between the insulator body 12 and the nut 60. It has been found desirable to locate the slots or steps of the washer such that when the interior shoulder 62 of the washer is in direct contact with the exterior shoulder 34 of the body 12 the slots overlap the rod-receiving opening 36 by approximately a sixteenth to one-eighth inch beyond the amount needed to simply grip the rod between the opening 36 and the slot. Accordingly, when the washer slot has been brought into engaging contact with the rod in opening 36, the shoulders 34 and 62 will still be spaced from one another as best shown in FIG. 6. The operator may then tighten nut 60 additionally, forcing the nut-receiving face 58 forwardly toward the opening 36. This additional tightening causes the washer 52 to deform until the shoulder 62 matably engages shoulder 34, resulting in the elastic deformation of the washer and compression thereof, causing a restoring reaction force 86 to be applied by the slots to the post. This restoring reaction force 86 assures a permanent and reliable gripping of the post and substantially eliminates the problem of insulator slippage upwardly or downwardly along the post or the loosening of the nut 60 over a period of time which can cause such slippage.

The nut 60 has a central bore 72 with threads 74 which are matably receivable on the threaded shaft 28. The nut 60 has outwardly extending arms 76 at diametrically opposed sides thereof to permit an operator to readily rotate the nut onto the shaft 28 adjacent the washer 52 to confine the washer between shoulder 34 and the nut 60. The nut 60 is formed of a plastic or plastic-like material but is preferably less compressible than washer 52 so as to better retain the washer against shoulder 34.

In operation, the fence builder removes the nut 60 from the threaded shaft 28 by standard rotation and then slips the insulator body 12 over the rod on which the insulator is to be mounted, the upper end of the rod being passed through the rod-receiving opening 36 until the insulator is at the desired elevation above ground level. In the event the rod post is of a large diameter between 11/16 and 13/16 inch the operator then slides washer 52 onto the threaded shaft 28 and seats the washer against the rod with the rod positioned within cooperating slots or clamps 64a and 64b, as best shown in FIGS. 1, 6 and 7. The largest standard diameter rod post 14, which has a diameter of ¾ inch, is easily received within the 13/16 inch diameter opening 36 even if the upper end 78 of the post 14 (FIG. 1) happens to be flared by pounding.

After the slots 64a and 64b have engaged the post, the construction of the washer still makes it possible for the washer to move forwardly as much as an additional ⅛ inch before the interior shoulder 62 encounters the exterior shoulder 34 of body 12. Accordingly, when the threaded nut 60 is threaded onto the shaft 28 and advanced against the face 58 of the washer, it forces the washer forwardly until the interior shoulder 62 engages the shoulder 34, compressing the washer between the nut and the rod and causing the slots 64a and 64b to tightly engage the post 14, exerting a restoring reaction force 86 on the post.

Similarly, when the rod post used with the insulator 10 is a smaller diameter rod 82, by illustration between 7/16 and ⅝ inch in diameter, the washer 52 is rotated about its central axis so that the steps or slots 66a and 66b engage the rod 82 as indicated in FIGS. 3 and 5. As explained above, the slots 66a and 66b will encounter and engage the rod 82 and closely retain it against the rod-receiving opening 36 before the interior shoulder 62 encounters the exterior shoulder 34. Accordingly, additional forward tightening of the nut 60 against the washer 52 will cause the washer to be forced forwardly until the inner shoulder 62 engages the shoulder 34, causing the washer to be compressed between rod 82 and nut 60 and accordingly to assert a reaction force 86 against the rod 82 caused by compression of the washer 52, resulting in the washer very securely gripping the rod 82. This construction provides a very long lasting and non-slip engagement between insulator 10 and post 82.

If a rod of diameter between 5/16 and 7/16 inch is to be used with the insulator, the washer 52 is rotated about its central axis to cause the slots 68a and 68b to engage the rod 80 (FIG. 8) and the nut tightened against the washer, as described in conjunction with the use of the insulator on larger rods. The washer is compressed between rod 80 and nut 60 until the interior shoulder 62 of the washer contacts the shoulder 34, again producing an extremely tight and reliable engagement between rod and insulator, as best shown in FIG. 8 where the washer is shown engaging the rod 80 and applying the reaction force 86 thereto.

Accordingly, the insulator 10 is mountable on any one of a plurality of rods within a predetermined range of rod thicknesses or diameters by having the rod-receiving opening 36 of a size capable of receiving the rod of greatest thickness within the range and by shaping the washer such that the steps or slots overlap the opening 36 to reduce the effective size of the rod-receiving opening and to bear against and closely confine within the opening any rod having a diameter within the range of thicknesses. The insulator 10 thus easily replaces a plurality of earlier insulators, each of which was designed to receive a specific diameter rod post. Additionally, the insulator 10 with its improved flashguard and greater spacing between flashguard and opening 36 is better able to prevent shorting between rod and wire when used with the most modern, higher voltage chargers.

While the preferred embodiment of the present invention has been described, it should be understood that various changes, adaptations and modifications may be made therein without departing from the spirit of the invention and the scope of the appended claims.

What is claimed is:

1. An insulator for supporting an electrically conductive fence wire and securely mountable on any one of a plurality of rods within a predetermined range of rod thicknesses comprising:
    an insulator body formed of insulative material and including fence wire retaining means capable of holding the fence wire, and further including an elongated threaded shaft having a rod-receiving opening therethrough with entry and exit for the rod, said opening being of a size capable of receiving the rod of greatest thickness within the range;
    a washer formed of insulative material and having a shaft-receiving orifice therethrough, said washer mounted with said shaft of said insulator body passing through said orifice with said washer movable toward and away from said rod-receiving opening and capable of overlapping said opening of said shaft to reduce the effective size of said rod-receiving opening to bear against and closely confine within said opening a rod having a thickness equal to the smallest rod thickness within the range; and
    a threaded nut threadably engaging said threaded shaft and adjacent said washer and in response to rotation of said nut urging said washer along said shaft toward said opening to successively further overlap said opening so as to be capable of gripping a rod within the range of thicknesses between said washer and said body to securely hold said body on the rod.

2. The insulator of claim 1 wherein said washer includes a nut-engaging face confronting said nut and bearing against said nut during threaded advancement of said nut along said shaft, said washer further including a plurality of rod-engaging steps, each step spaced a predetermined distance from said nut-engaging face and positionable to overlap said rod-receiving opening so as to be capable of bearing against a rod of predetermined thickness within said opening and cooperating with said body to grip a rod therebetween to hold said body on the rod.

3. The insulator of claim 1 wherein said washer includes a pair of clamps for retaining said insulative body on the rod, a clamp being positioned adjacent said entry and adjacent said exit of said opening to engage the rod adjacent said entry and adjacent said exit, said clamps overlapping said opening to reduce the size of said opening to retain the rod in said rod-receiving opening between said body and said clamp.

4. The insulator of claim 3 wherein said clamp includes an arcuate slot of substantially constant radius to closely engage a rod of predetermined thickness.

5. The insulator of claim 1 wherein:
    said body includes a bulbous segment located between said threaded shaft and said fence wire retaining means, said bulbous segment having said rod-receiving opening therethrough and said segment including an exterior shoulder commencing adjacent said threaded shaft and tapering outwardly from said shaft and extending forwardly toward said fence wire retaining means; and
    said washer orifice includes an interior shoulder to matably receive said exterior shoulder of said body to thereby limit the forward travel of said washer along said shaft toward said wire-retaining means.

6. The insulator of claim 1 wherein said washer includes a plurality of pairs of clamps and said washer orifice is generally circular in cross section, said clamps of each said pair of clamps being positioned on diametrically opposed edges of said orifice, with each said pair of clamps successively positionable adjacent said entry and said exit of said opening by rotation of said washer about the central axis of said orifice to thereby permit one clamp of a said pair to engage the rod adjacent said exit and the remaining clamp of a said pair to engage the rod adjacent said entry, each said pair of clamps overlapping said opening to reduce the size of said opening in order to retain the rod in the opening between said body and said clamp, each said pair of clamps being shaped to matably receive a rod of predetermined shape and thickness.

7. The insulator of claim 6 wherein said clamps are separated from one another by rigid ears.

8. The insulator of claim 1 wherein said body includes an outwardly extending flashguard separating said retaining means from said rod-receiving opening to provide further electrical isolation therebetween to thereby minimize shorting between the conductive wire retainable by the body and the rod on which said body is mountable.

9. The insulator of claim 1 wherein said washer is formed of elastically deformable material and has an interior shoulder about said orifice and wherein said insulator body includes an exterior shoulder between said shaft and said rod-receiving opening and positioned to receive said interior shoulder of said washer, said washer being urged forwardly toward said opening and said interior shoulder moved forwardly toward engagement with said exterior shoulder by advancement of said nut, causing said washer to be compressed between a rod in said opening and said nut to generate a reactive restoring force in said washer and applying the force to the rod to keep said body in position on the rod.

* * * * *